United States Patent [19]
Tuy et al.

[11] Patent Number: 5,170,347
[45] Date of Patent: Dec. 8, 1992

[54] SYSTEM TO REFORMAT IMAGES FOR THREE-DIMENSIONAL DISPLAY USING UNIQUE SPATIAL ENCODING AND NON-PLANAR BISECTIONING

[75] Inventors: Heang K. Tuy, Cleveland; Todd J. Krochta, Akron; Frederick C. Mailey, South Euclid; Hsayjern Lin, Richmond Hgts., all of Ohio

[73] Assignee: Picker International, Inc., Highland Heights, Ohio

[21] Appl. No.: 517,388

[22] Filed: Apr. 30, 1990

Related U.S. Application Data

[63] Continuation of Ser. No. 200,697, May 31, 1988, abandoned, which is a continuation-in-part of Ser. No. 126,368, Nov. 27, 1987, Pat. No. 4,882,679.

[51] Int. Cl.$^5$ .................. G06F 15/42; G06F 15/72
[52] U.S. Cl. ........................ 364/413.22; 364/413.19
[58] Field of Search ............... 364/413.16, 413.19, 364/413.22, 521, 522; 378/901; 382/44, 45; 340/729

[56] References Cited

U.S. PATENT DOCUMENTS

| | | | |
|---|---|---|---|
| 4,075,700 | 2/1978 | Blay | 364/413.22 X |
| 4,418,387 | 11/1983 | Yamaguchi | 364/413.19 |
| 4,520,316 | 5/1985 | Hall et al. | 324/309 |
| 4,538,227 | 8/1985 | Torachi et al. | 364/413.22 |
| 4,608,635 | 8/1986 | Osterholm | 364/413.22 |
| 4,674,046 | 6/1987 | Ozeki et al. | 364/413.18 |
| 4,710,715 | 12/1987 | Mee et al. | 324/307 |
| 4,710,876 | 12/1987 | Cline et al. | 364/413.22 |
| 4,729,098 | 3/1988 | Cline et al. | 364/413.18 |
| 4,737,921 | 4/1988 | Goldwasser et al. | 364/518 |

OTHER PUBLICATIONS

Frieder, G. et al., "Back-to-Front display of voxel-based objects", *IEEE CG&A*, Jan. 1985, 52–60.

"Direct 2-D Display of 3-D Objects" by Tuy, et al., IEEE, ,CG&A, Oct. 1984, pp. 29–33.

"The Theory, Design, Implementation and Evaluation of a Three Dimensional Surface Detection Algorithm" by Artzy, et al., Computer Graphics & Image Processing, 15, 1981, p. 1–24.

"Geometric Modeling Using Octree Encoding" by D. Meagher, Computer Graphics and Image Processing, (1982), pp. 129–147.

"Interactive Segmentation and Boundary Surface Formation for 3-D Digital Images" by J. Udupa, Computer Graphics and Image Processing, (1982), pp. 213–235.

*Primary Examiner*—Clark A. Jablon
*Attorney, Agent, or Firm*—Fay, Sharpe, Beall, Fagan, Minnich & McKee

[57] ABSTRACT

A system for three-dimensional diagnostic imaging generates a plurality of slice images of a specimen. A region of interest is selected from within a slice and is extrapolated to subsequent slices. A boundary indicative of a surface of interest is selected from within the region of interest to facilitate generation of an image representative of a three-dimensional surface of interest to be assembled from subsequent slices of the plurality. A viewing surface is defined in relation to a generated surface image which was selected from the boundary. A scaling means assigns a scaled gray level to the three-dimensional image to facilitate three-dimensional viewing of the object when it is projected on the viewing surface. Image information is selectably modified by data from the original slice images to add surface density visualization. Means is also provided to facilitate selective segmentation of a three-dimensional image along a plane or planes of interest. An interactive procedure is provided to facilitate cutting of a three-dimensional object from its perspective view (with or without density information).

17 Claims, 12 Drawing Sheets

FIG. 2A
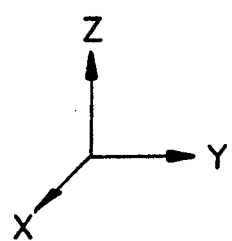
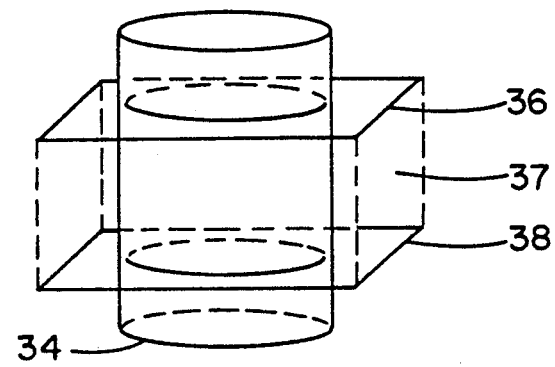
FIG. 2B
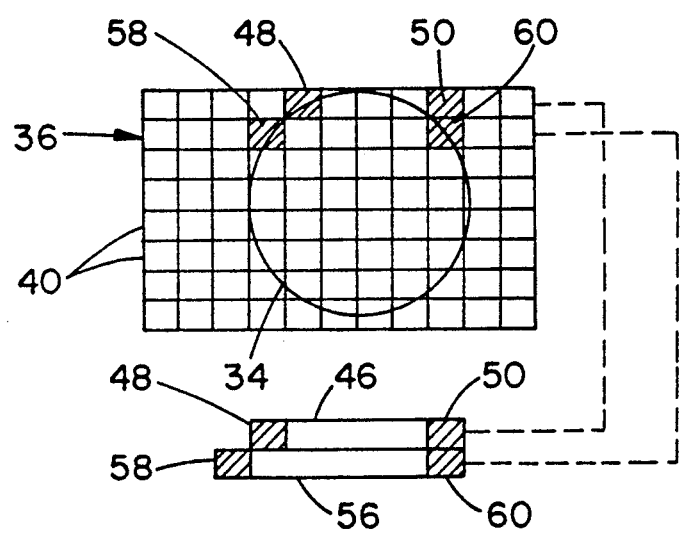
FIG. 2C
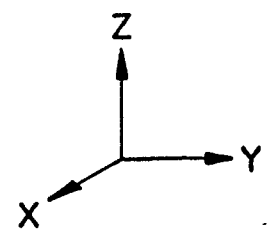
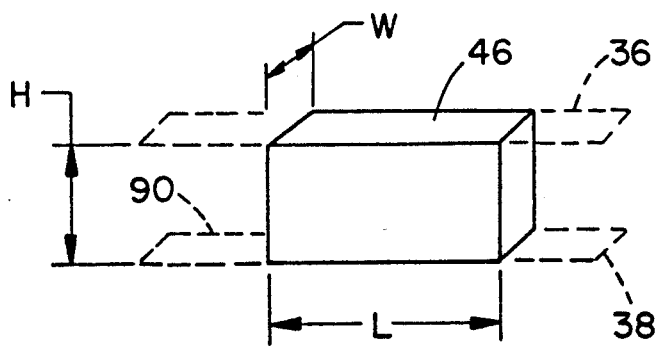

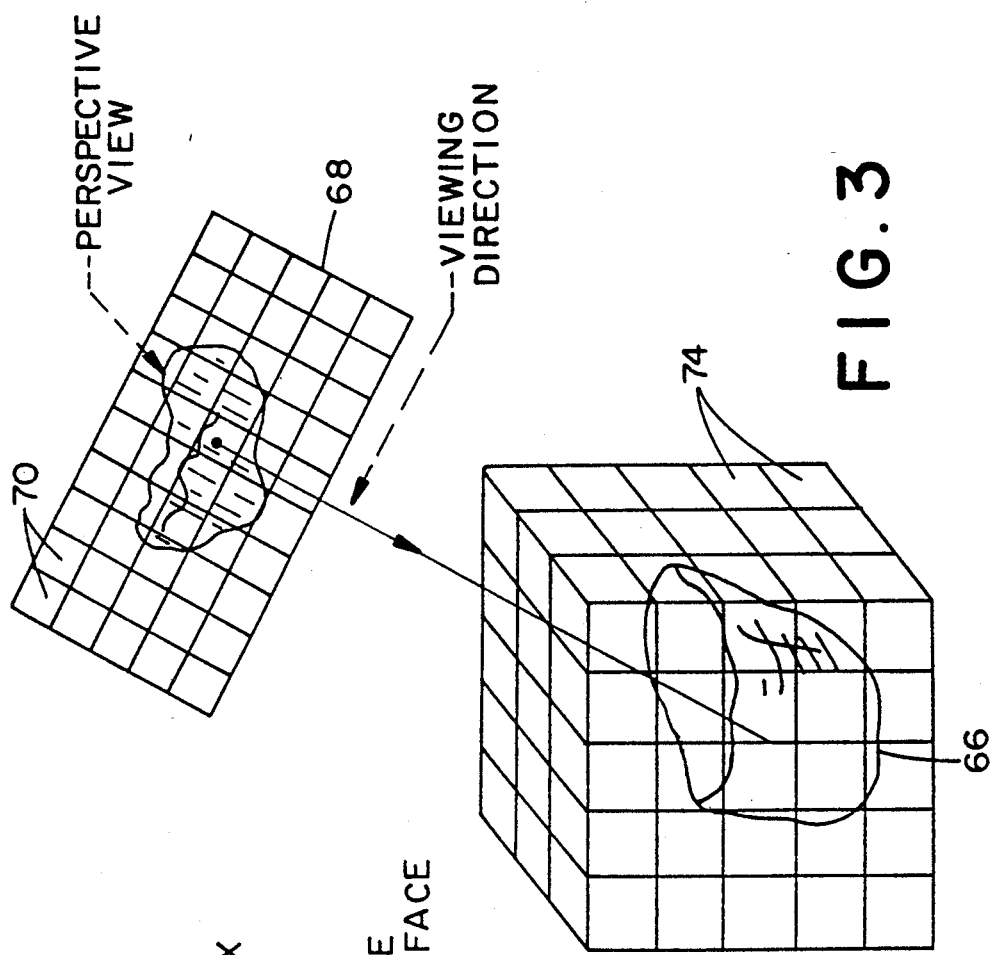
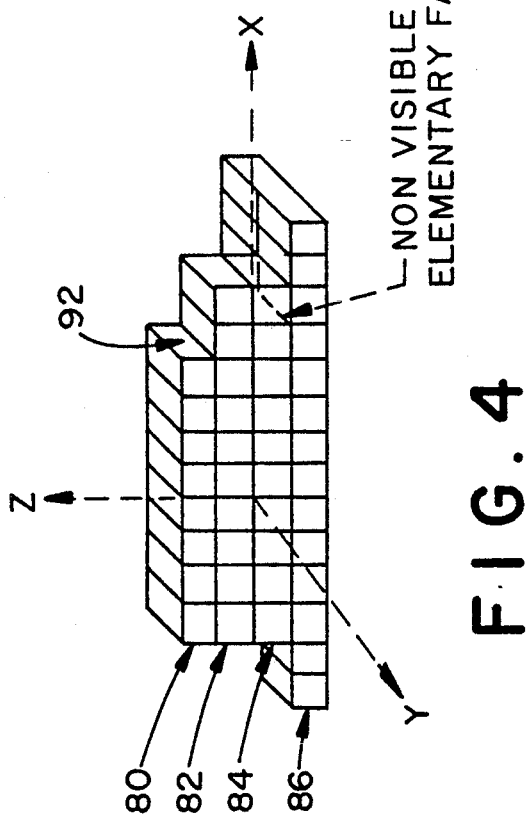

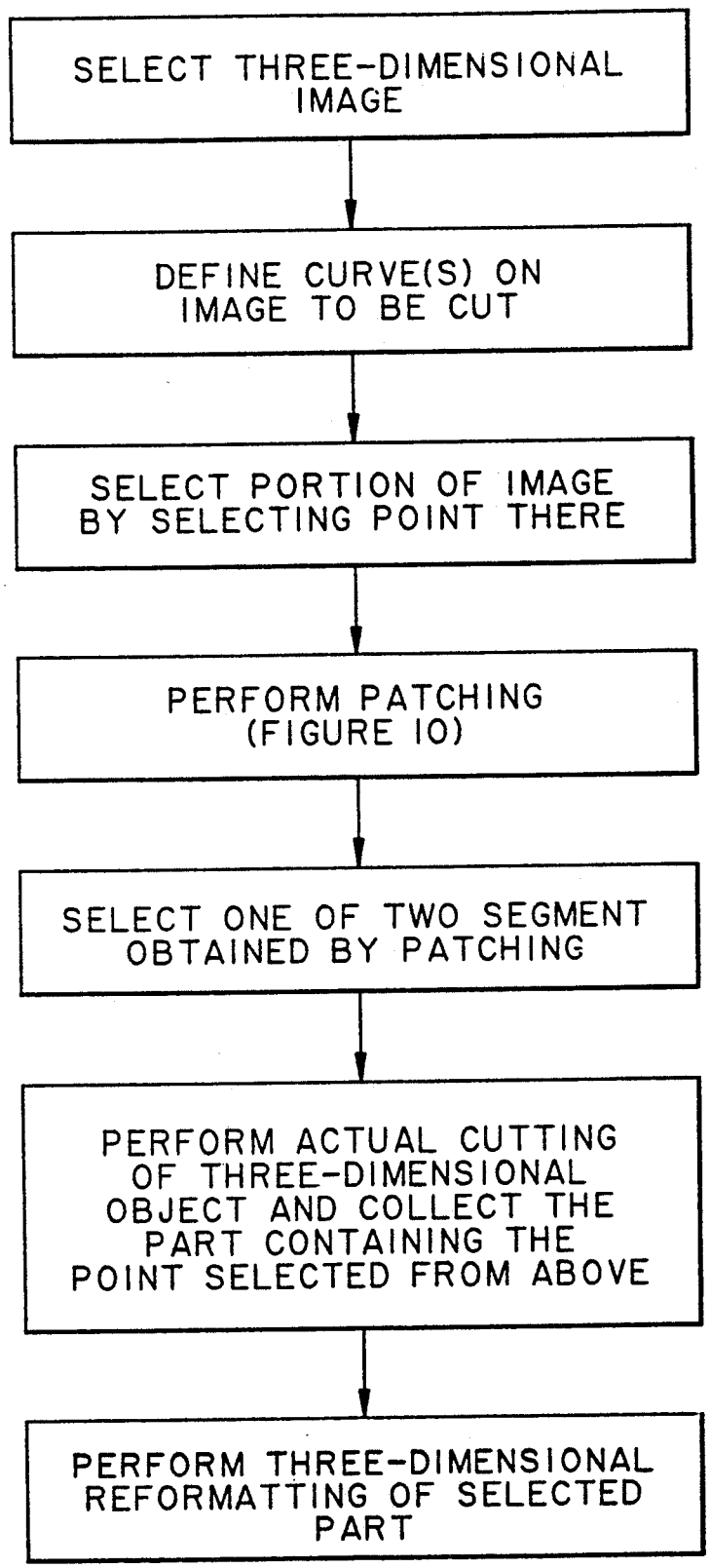
FIG. II

SYSTEM TO REFORMAT IMAGES FOR THREE-DIMENSIONAL DISPLAY USING UNIQUE SPATIAL ENCODING AND NON-PLANAR BISECTIONING

BACKGROUND OF THE INVENTION

This application is a file-wrapper continuation of U.S. patent application Ser. No. 200,697, filed May 31, 1988, abandoned, which application is in turn is a continuation-in-part of U.S. patent application Ser. No. 126,368, filed Nov. 27, 1987 now U.S. Pat. No. 4,882,679.

This application pertains to the art of diagnostic imaging and more particularly to three-dimensional imaging.

The invention finds applicability to CT scanners and will be described with particular reference thereto. However, it will be appreciated that the invention has broader application in conjunction with generating three-dimensional diagnostic images from data acquired from other imaging modalities, e.g. by magnetic resonance imaging.

In computed tomography ("CT") and magnetic resonance imaging ("MRI"), cross-sectional images of the human anatomy may be generated. Data obtained by the CT or MRI scanners is assembled and a gray scale is assigned in accordance with data obtained from a particular section of the data.

Because organs are three-dimensional in reality, a series of slices or scans must be taken. The series of slices are mentally integrated to visualize the actual anatomy. It would be advantageous to reformat such a series of reconstructed planar images electronically in a more familiar format to aid physicians in their mental integration. Such electronic reformatting would assist communication between radiologists, referring physicians, collaborators, and their patients. Better planning in medical treatments or surgical operations results from the improved communication.

In the last decade, there have been many suggested methods to reformat cross-sectional images and present them as a three-dimensional image from any perspective view. Essentially, five different approaches have been tried. These include the cuberille approach, the octree approach, the ray tracing approach, the triangulation approach, and the contour approach. In the cuberille approach, for example, preprocessing of original image data is required as the underlying model of this approach assumes that the three-dimensional object is composed of cubes of the same size. Each of these approaches, however, suffers from its own distinct disadvantageous.

In order for a three-dimensional imaging processor to become practically useful, a system response must be extremely fast, ideally less than one second per frame if not real time. In the prior art systems, implementation at such speeds could only be achieved with use of special purpose hardware. Such special purpose hardware is extremely expensive and is generally not cost effective. Such dedicated hardware is not usable for other process operations except for its designated three-dimensional reformatting.

Another disadvantage of the prior art lies particularly with the cuberille-type approach. In fact, input data from a CT or MRI scanner is typically not cubic because the distance between two consecutive slices is commonly much larger than the dimensions of the pixels of the reconstructed images. Accordingly, resolution and accuracy are forfeited.

The present invention contemplates a new and improved method and apparatus which overcomes all of the above referred problems and others. Yet, it provides a system for generating three-dimensional diagnostic images which is simple, economical, and readily adaptable to general purpose processor means.

SUMMARY OF THE INVENTION

In accordance with the present invention, a system for generating three-dimensional diagnostic images includes an image memory for storing spacially encoded image data representative of a physical characteristic of a three-dimensional object. Means is provided for generating spacially encoded primary curve data representative of a selected primary curve. A surface generating means provides spacially encoded cutting surface data in accordance with the selected primary curve. Means is provided for apportioning the spacially encoded image data into at least two portions in accordance with the cutting surface data. Means is provided for generating a visual display in accordance with data of one of the portions.

In accordance with another aspect of the present invention, a system for generating three-dimensional images includes a memory for storing a plurality of spacially encoded image data points as a series of generally planar slices. Each slice is comprised of a series of generally parallel scan lines formed from a portion of the image data points. Means is provided for storing a cutting surface and apportioning the spacially encoded image data points in accordance with the cutting surface. The apportioning is accomplished by a means which compares image data points of a slice with the cutting surface data, determines slice intersection points between the cutting surface and image data of each of the slices, generates data representative of a line segment interconnecting each plurality of intersection points lying in a common one of the slices, determines scan line intersection points between scan lines of a planar slice in each line segment thereof, and divides the spacially encoded image data points into at least first and second portions in accordance with the scan line intersection points. A means is then provided to generate a visual display of at least one of the portions.

In accordance with another aspect of the present invention, a method for generating a three-dimensional display is provided. In this method, spacially encoded image data representative of a physical characteristic of a three-dimensional object is stored. Spacially encoded primary curve data representative of a selected primary curve is generated and a spacially encoded cutting surface is in turn generated therefrom. The spacially encoded image data is apportioned into at least first and second portions in accordance with the cutting surface data. A visual display is generated in accordance with the spacially encoded data of at least one of the portions.

In accordance with another aspect of the present invention, a method of generating three-dimensional images includes storing a plurality of spacially encoded image data points as a series of generally planar slices. Each slice includes a series of generally parallel scan lines whereby each scan line includes a portion of the image data points. Spacially encoded data representative of a cutting surface for apportioning the spacially encoded image data points into at least first and second portions is stored. The spacially encoded image data points are apportioned by the steps of comparing the image data points with the cutting surface data, determining slice intersection points between the cutting surface and image data points of each of the slices in accordance with the comparison, generating line segment data representative of a line segment interconnecting each plurality of intersection points lying in a common slice, mapping scan line intersection points between generally each scan line of a planar slice and each line segment of each slice, and dividing the spacially encoded image data points into at least the first and second portions in accordance with the scan line intersection points. A visual display is then generated in accordance with the spacially encoded data of at least one of the portions.

One advantage of the present invention is that a system is provided wherein a three-dimensional image is generated from a series of slice scans obtained from conventional imagers.

Another advantage of the present invention is the provision of a system for generating three-dimensional images with increased fidelity and resolution.

Another advantage of the present invention is that three-dimensional images are generated without specialized hardware.

Another advantage of the present invention is that it enhances visualizing surface density of three-dimensional images.

Still another advantage of the present invention is the capability of cutting 3-D objects from 3-D views.

Further advantages will become apparent to those of ordinary skill in the art upon a reading and understanding of the following detailed description.

BRIEF DESCRIPTION OF THE DRAWINGS

The invention may take physical form in certain parts and arrangements of parts or in various steps and arrangement of steps. The following specification and drawings are for illustrating preferred embodiments and are not to be construed as limiting the invention.

FIGS. 2a,b,c are diagrams illustrating three-dimensional image generated in accordance with the present invention;

FIG. 3 illustrates a segmented object and a projection thereof onto a viewing surface;

FIG. 4 illustrates a scheme for three-dimensional image data projection onto a viewing area;

FIG. 11 illustrates a flow chart for cutting operation;

DETAILED DESCRIPTION OF THE PREFERRED EMBODIMENTS

Figure 1:
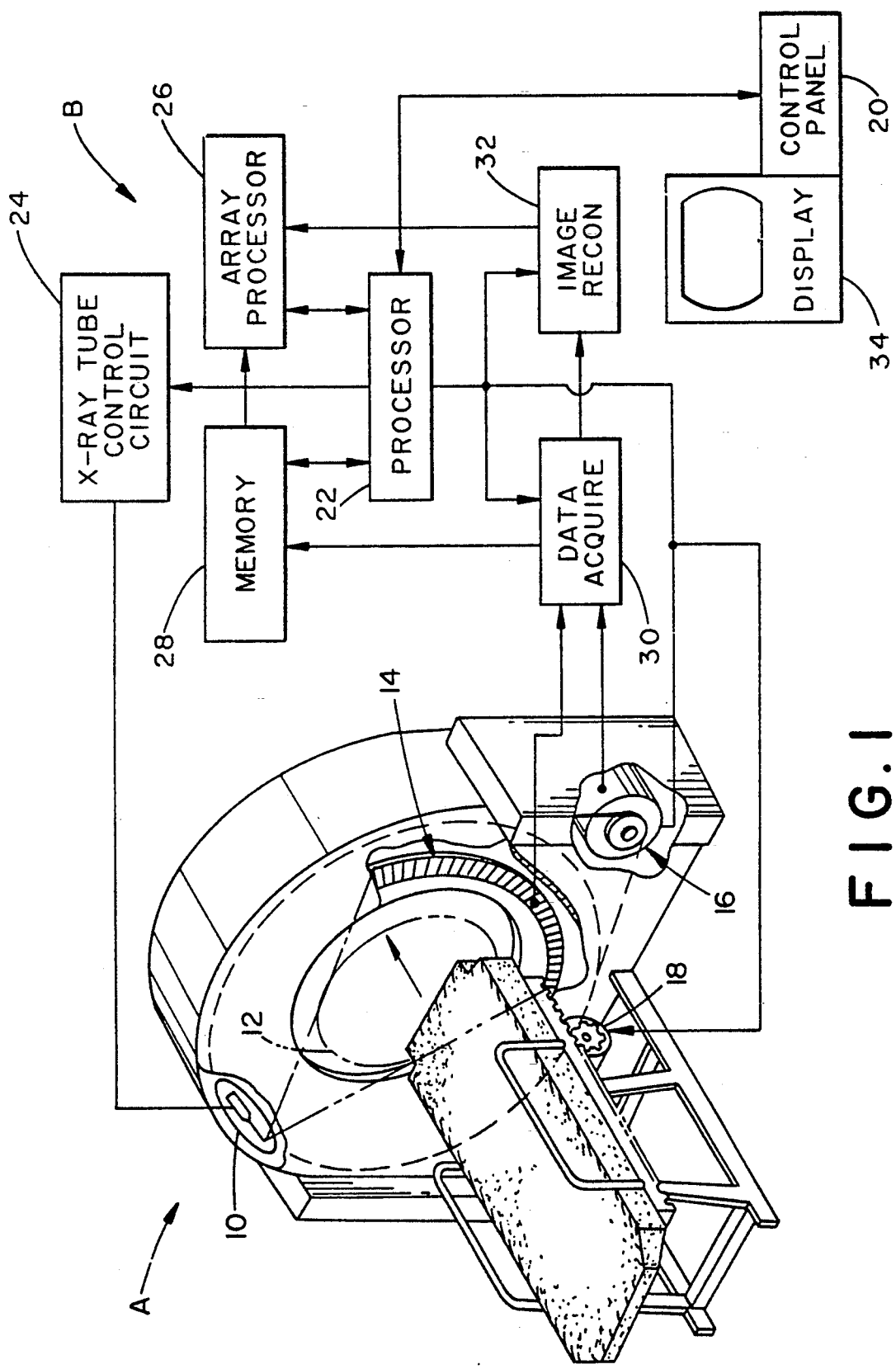
FIG. 1 is a block diagram of a three-dimensional image generating apparatus of the present invention.

Referring now to FIG. 1, an acquisition means for acquiring slice data A is interfaced with a data processor/control circuit B. As illustrated, the acquisition means A is comprised of a CT scanner and will be described with particular reference thereto. It will be appreciated, however, that similar slice data may readily be acquired by any other suitable slice image apparatus such as an MRI device.

The CT scanner is comprised of a rotating anode x-ray tube 10 which projects a fan beam of x-rays through an image circle 12 to a detector array 14. The x-ray source 10 is variable in relation to the image circle 12 to provide relative motion therebetween under the control of motor means 16. A plurality of generally parallel slices is obtained by relatively positioning a subject with respect to the image circle 12 between subsequent scans by means such as an incrementing drive means 18. Under direction of a control panel 20, a general processor 22 interfaces an x-ray tube control circuit 24 which facilitates acceleration/deceleration control of the x-ray tube 10, as well as controlling generation the x-ray fan beam. An array processor 26 works under control of a program stored in a memory means 28. The array processor functions in conjunction with the processor 22 and under programming described below. Use of an array processor is advantageous for rapid processing of the three-dimensional image data of the present system.

Slice data is acquired from the acquisition means A via data acquisition circuitry 30. A series of images are reconstructed by the image reconstruction circuitry 32. Finally, a display means 34 allows for viewing of a resultant image.

In the preferred embodiment, the array processor 26 is comprised of three processor elements for facilitating rapid computation. It will be appreciated, however, that other processing units will function adequately when images are processed in accordance with the teachings of the present system.

The array processor 26 takes a set of images of consecutive slices of a three-dimensional object (generated by the acquisition means A, via the image reconstruction means 32, and produces spatially encoded slice data indicative of a physical property thereof. Such a set of slices is conveniently referred to as a slice set. The means 32 is provided for assigning a viewing value to generally all subregions of at least one of the generally planar slices. This viewing value is suitably a gray scale level. These images of consecutive slices are given in a format similar to that of a conventional CT or MRI scanner. For example, a reconstruction means is suitably comprised of a convolver and a back projection system which generates a grid of pixel values, the magnitude of which is indicative of a gray scale. In MRI, each pixel value is a complex number (real and imaginary parts).

The subject procedure for generating the three-dimensional images renders such a generation to be particularly adaptable to conventional processors such as the subject array processor. Three-dimensional objects under investigation, such as bones or organs, usually extend through many consecutive cross-sectional image slices. For instance, a set of cross-sectional CT images would be required for investigation of a lumbar spine since the spine extends beyond one slice's thickness. To extract the three-dimensional object from the slice efficiently, a three-dimensional box is initially selected which is large enough to encapsulate the three-dimensional object under investigation. This three-dimensional box, referred to as a box of interest ("BOI"), is smaller than a total volume represented by the slice set. The BOI reduces total information necessary to process and, therefore, reduces the processing time. The BOI apportions each image slice into regions. Each such region, referred to as a region of interest ("ROI"), is in turn comprised of a plurality of subregions which are represented by data obtained from the data acquisition means. The ROI is preferably selected on a single slice image and projected or extrapolated onto subsequent slices for practicality. It will be appreciated, however, that in certain situations it may be desirable to select a plurality of ROI's to encompass a certain volume. For example, a first ROI might be defined from a slice, and a second ROI which may have different dimensions defined on the last slice. Projecting between the first and second ROI's through the intermediate slices defines a series of intermediate ROI's. For most purposes, however, a single ROI with a given set of dimensions extrapolated or projected onto subsequent slices is adequate.

After a region of interest has been defined, a three-dimensional surface or boundary of interest of a subject is selected from therewithin. This may define, for example, a surface or boundary of an organ or organs. Again, such object is suitably selected from a single ROI from a single slice and projected onto subsequent ROI's of the box of interest. In certain situations, however, it is appreciated that the boundary of interest may desirably be selected from two or more of the regions of interest.

Selection of the boundary of interest may be made by manual selection from a display, such as by placing a cursor on that boundary, or by isolating a particular boundary with a given gray scale level. In the preferred embodiment a combination of both is implemented. The region of interest is initially generated as a planar image. A selected range of gray scales is assigned to this region of interest, and only those areas falling within this range are then illuminated. An operator or technician then selects, through the control panel 20 (FIG. 1), which of the surfaces or boundaries within this range are to be taken. This is in turn projected onto subsequent regions of the box of interest.

Turning to FIG. 2a, a sample object 34 is illustrated in a box of interest 36 which has in turn been assembled between consecutive slices 36a, 36b. The object or specimen 34 is illustrated as sectioned in its entirety by the slices 36a and 36b. Regions of interest 37, 38 are selected from each slice. With reference to FIG. 2b, each region of interest 37, 38 is itself comprised of subregion data 40 which may be referred to as a picture element or pixel. The pixel is so named due to its use to generate a subsequent image by assignment a unique viewing value or gray scale level thereto which is a function of the physical property of that particular element as gleaned from the slice imaging apparatus. The pixels 40 of each region of interest 37, 38 are defined, a volume element ("VOXEL") which is indicative of a volume property of the subject specimen is definable.

In general, an object 34 under investigation must undergo further processing from the three-dimensional box which encases it. In the present system, this processing is referenced to as segmentation. Segmentation consists of multiple computer graphics and image processing techniques used in unison. These techniques include thresholding, contouring, and region growing. The segmentation process allows for the image processing to be completed on a standard processor. In segmentation, once the object of interest is isolated from the three-dimensional box in the fashion illustrated above, the object is represented in a concise fashion. In the present system, the scan line representation technique is implemented. In this technique, an object is represented by a set of three-dimensional line segments which fill the object volume completely. Each segment is, in turn, represented by its slice number representative of the particular slice in which the segment belongs, the row number of the segment within the slice, and its end points. Turning particularly to FIG. 2(b), it will be seen that creation of two such segments has been illustrated. The segment 46 is defined as being disposed between the endpoints (pixels) 48, 50, while the segment 56 is defined by the endpoints 58, 60.

Turning to FIG. 2c, a parallelepiped is defined by each segment, the particulars of which will be described in more detail below.

With reference to FIG. 3, the presently described three-dimensional reformatting process is capable of generating perspective three-dimensional images of an object 66 in any given viewing direction. Each viewing direction is associated with a rectangle or a square viewing surface such as 68 on which corresponding perspective three-dimensional images are formed. This rectangle or viewing area is referred to as a screen. The generated three-dimensional image is viewed by displaying it on a two-dimensional viewing area. Such as that continued in display console 34 (FIG. 1).

A perspective three-dimensional view of a three-dimensional object may be viewed as being comprised of orthogonal projections to the screen of points on the surface of the object onto that screen. To provide a depth queue effect in the viewing of the generated image, the projected points on the screen are assigned, via the processor 26 (FIG. 1) functioning as a scaling means, with a viewing value, such as a number representing a shade of gray, called a gray level or scale. This assigned gray level decreases linearly with respect to a viewing distance from a corresponding point on the surface of the object along a normal to the screen. The viewing direction is assumed to be normal to the screen. In this framework, if two points on a surface of the object project onto the same point of the screen, only a point closest to the screen is visible. Moreover, points on the surface of the object which are closer to the screen are seen painted whiter, and points on the surface which are further away from the screen are darkened to facilitate a pseudo three-dimensional picture.

To render the curvature of the surface of the object at a given point, the scaling means may alternatively or additionally include means to assign a corresponding gray level multiplied with a weighing function. The weighing function is proportional to a cosine of an angle between the normal to the screen and the normal to the surface of the object that a particular point in consideration. For an efficient implementation in terms of computational time and computer memory, this angle is estimated from the distance of the surrounding points in the screen to corresponding visible points on the surface of the object. More precisely, the formula used to assign a gray level appears below:

$$g = SCALE * \cos^m \text{Maximum}(AVERD, CUTOFF) * (K*(d-DMAX) + GMIN) \quad \text{FORMULA (1)}$$

where:
- g = assigned gray level
- d = assigned distance to viewing area
- K = (GMAX − GMIN)/(DMIN − DMAX)
- DMIN = 0.5*DIAG
- DMAG = 1.5*DIAG
- DIAG ≡ the diagonal of the Box Of Interest
- AVERD ≡ sum of four numbers, each number being the minimum between MAXA and the absolute value of the difference between the distances assigned to one of the four opposite pairs of pixels surrounding the pixel in consideration
- GMAX, GMIN, m, MAXA, CUTOFF, and SCALE are arbitrary values depending on the desired viewing characteristics; in the preferred embodiment, suitable values are: GMAX = 255, GMIN = −255, m = 20, MAXA = 25, CUTOFF = 0.9919, and SCALE = 1/200

With continuing reference to FIG. 3, as a surface rendering is carried out by the processors, the rectangular screen 68 is divided into small squares 70, called screen pixels. For a good resolution of three-dimensional views of the object, it is advantageous to consider a screen just large enough to contain a projection of the object. To achieve this goal, the diagonal of the box of interest is advantageously chosen to be a side dimension of the screen.

A magnification factor of the three-dimensional image is suitably achieved by choosing a screen of smaller size as the number of pixels subdividing the screen remains constant. For example, 256×256 pixels or 512×512 pixels is suitably chosen. The number of pixels of a screen will be referred to as the screen resolution. A change of three-dimensional views of the object is suitably realized by changing a position of the screen, rather than by rotation of an object itself. Such a positioning of the viewing surface 68 is depicted in relation to the object 66.

As noted above, the three-dimensional object is represented by a set of segments. In such a representation, a line segment belonging to the object represents a part thereof. (See, e.g., segment 46 of FIG. 2b.) If all slices are parallel to one another, dividing slice into pixels is facilitated by rectangular grids as illustrated in FIG. 2b. Each segment represents a parallelepiped containing it. Dimensions of the parallelepiped 90 are as follows:
- l = the length of the line segment 46 1;
- w = the common side of pixels in an axial plane of the slice w; and
- h = the distance between the slice containing the line segment and the following slice h.

For practical purposes, the union of all the parallelepipeds associated with the segments in the object representation approximates the surface of the three-dimensional object to be displayed. This assumption becomes more and more accurate as the distance between two consecutive slices becomes smaller and the number of pixels making up each slice becomes larger.

Preferably, the sampling of the object in study is uniform, that is, the whole three-dimensional box of interest is subdivided into non-overlapping small parallelepipeds or voxels 74 (FIG. 3) or 90 (FIG. 2c) of common size and shape. All the slices are subdivided by small pixels of equal size. A distance between two consecutive slices is constant throughout the entire three-dimensional box. The six faces of each voxel consist of two faces in the two slices sandwiching the voxel, and four other faces connecting the two pixels. With the proper choice of a coordinate system, the faces of all of the voxels are perpendicular to one axis of the coordinate system.

With reference to FIG. 4, an elementary face of a voxel is advantageously defined as that in a subdivision of the three-dimensional box. In the Figure, segments 80, 82 84, and 86, each generated from a unique slice, are illustrated. An elementary face such as that 92 is advantageously defined as a rectangle perpendicular to one of the axis of the coordinate system.

The object to be displayed is suitably approximated by a union of the all the parallelepipeds associated with the line segment representing the object. It is sufficient to consider only the elementary faces covering the parallelepipeds to construct a three-dimensional surface rendering of the object. In FIG. 4, concepts related to potentially visible elementary faces, non-visible elementary faces, and classification of potentially visible faces are illustrated. Two types of elementary faces are perpendicular to an axis of reference. One type consists of faces facing toward a positive direction of the axis and the other consists of faces oriented toward the negative. For example, a visible elementary face 92 is perpendicular to the y-axis. All together there are six possible elementary faces.

An elementary face is defined to be visible if it contains a visible point. For a given view, some elementary faces are visible, and some are not. An elementary face may be visible for one view, but may not be visible for another view.

To increase the speed in the formation of the three-dimensional perspective image of the object in the given direction to render the system adaptable for use in conjunction with a standard processor, most of the non-visible elementary faces are excluded from the list of faces to be processed. Criteria are seized upon to recognize non-visible faces for the exclusion process.

An elementary face is not visible if it is a common elementary face of two parallelepipeds belonging to the object. For a given view, there exists only three directions faces which may be visible. Elementary faces which are not excluded by these criteria are called potentially visible faces.

As elementary faces are classified into six different classes, at first those faces which are non-visible which satisfy at the first criteria at the same time are suitably eliminated.

In the example of FIG. 4, a second elimination criteria, will be noted. Only two elementary faces of a parallelepiped perpendicular to the x-axis are potentially visible. Both of them correspond to the end points of a corresponding segment of the object representation, and both are listed in two different lists. It is assumed that within an image slice, line segments representing a three-dimensional object are parallel to the y-axis.

An elementary face perpendicular to the y-axis facing toward the positive direction is a potentially visible face if it is not an elementary face of a parallelepiped right in front of it. An elementary face perpendicular to the y-axis facing toward the negative direction is a potentially visible face if it is not an elementary face of a parallelepiped immediately behind it.

An elementary face perpendicular to the x-axis facing toward the positive direction is a potentially visible face if it is not an elementary face of a parallelepiped immediately on top of it. An elementary face perpendicular to the z-axis facing toward the negative direction is a potentially visible face if it is not an elementary face of a parallelepiped immediately below it.

If elementary faces oriented toward the positive direction are potential visible, then elementary faces of the opposite direction are not, and vice versa.

Potentially visible elementary faces which are perpendicular to an axis are grouped into two different lists. One list consists of faces which are facing toward the positive direction of the axis, and the other consists of faces facing toward the negative direction. Consequently, the potentially elementary faces of the three-dimensional objects are classified and grouped in different lists.

For a given view, each elementary face is projected on a viewing area or screen as a parallelogram. Since the size of the elementary face is the same for all elementary faces of the same type, the size of their projections on the screen remains invariant. Each point of the parallelogram is assigned with its distance to the point of the element face along the viewing direction.

If more than two points from different elementary faces are projected to the same point on the screen, the projected point is assigned with the shortest distance. After all potentially visible faces are processed in the above manner, the shading of the image of the object on the screen can be done by assigning to each point on the screen as the following:

the point is a background point if there is no point of an elementary face projected on to it, the assigned gray level is a negative number, for instance minus one thousand;

otherwise, the point corresponds to a visible point of the surface of the object.

With regard to formula (1), above, the gray level assigned to the point decreases linearly with respect to the distance of the corresponding visible point on the screen and is proportional to a power of the cosine of the maximum of two numbers CUTOFF and AVERD. The number CUTOFF is fixed and is chosen once for all. The number AVERD is the sum of four other numbers, each number being obtained by taking the minimum between a number MAXA and the absolute value of the difference between the distances assigned to one of the four opposite pairs of pixels surrounding the pixel in consideration. In the subsequent implementation, the assigned gray level g is computed as a function of the assigned distance d by formula (1) above.

Figure 5:
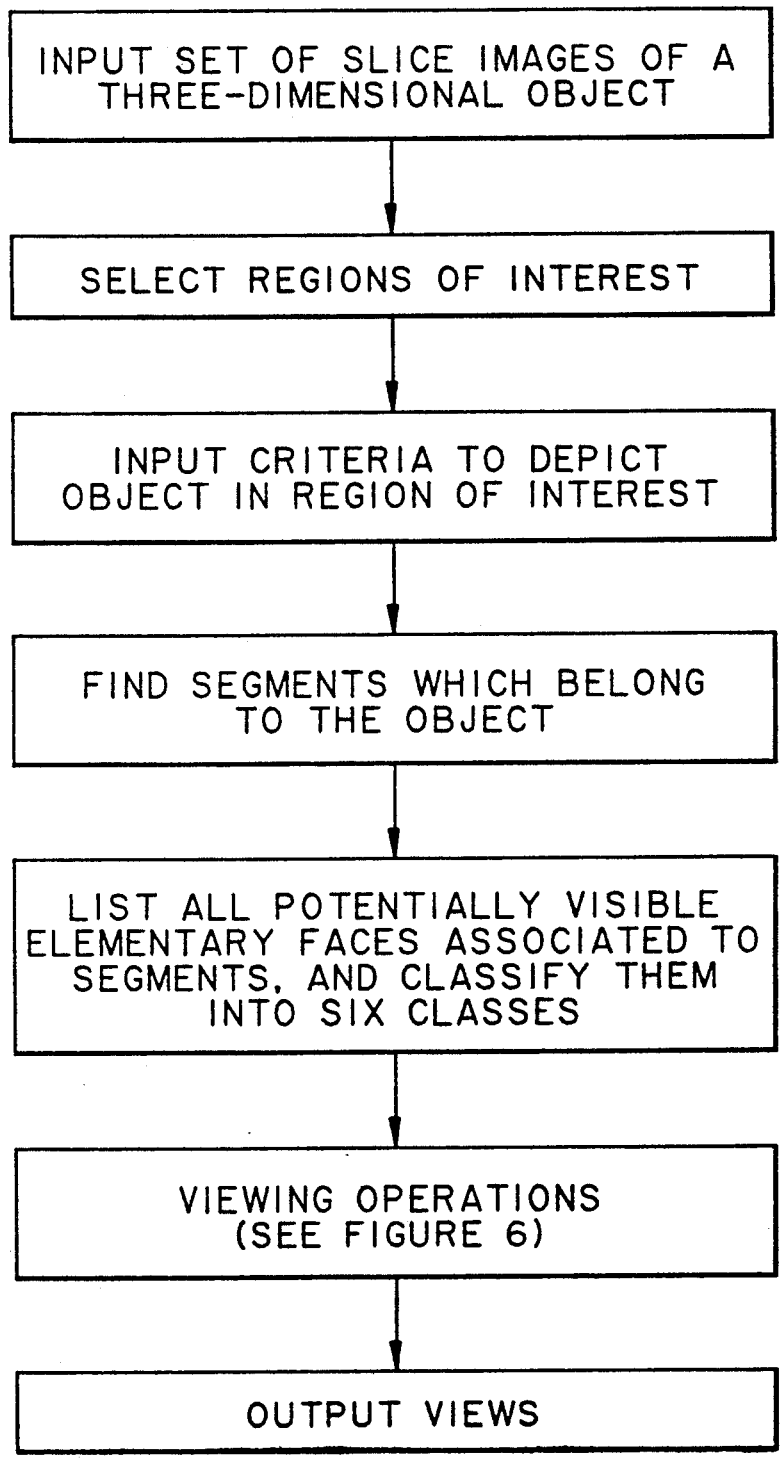
FIG. 5 is a flow chart for facilitating generation of the three-dimensional image of the present system.
Figure 6:
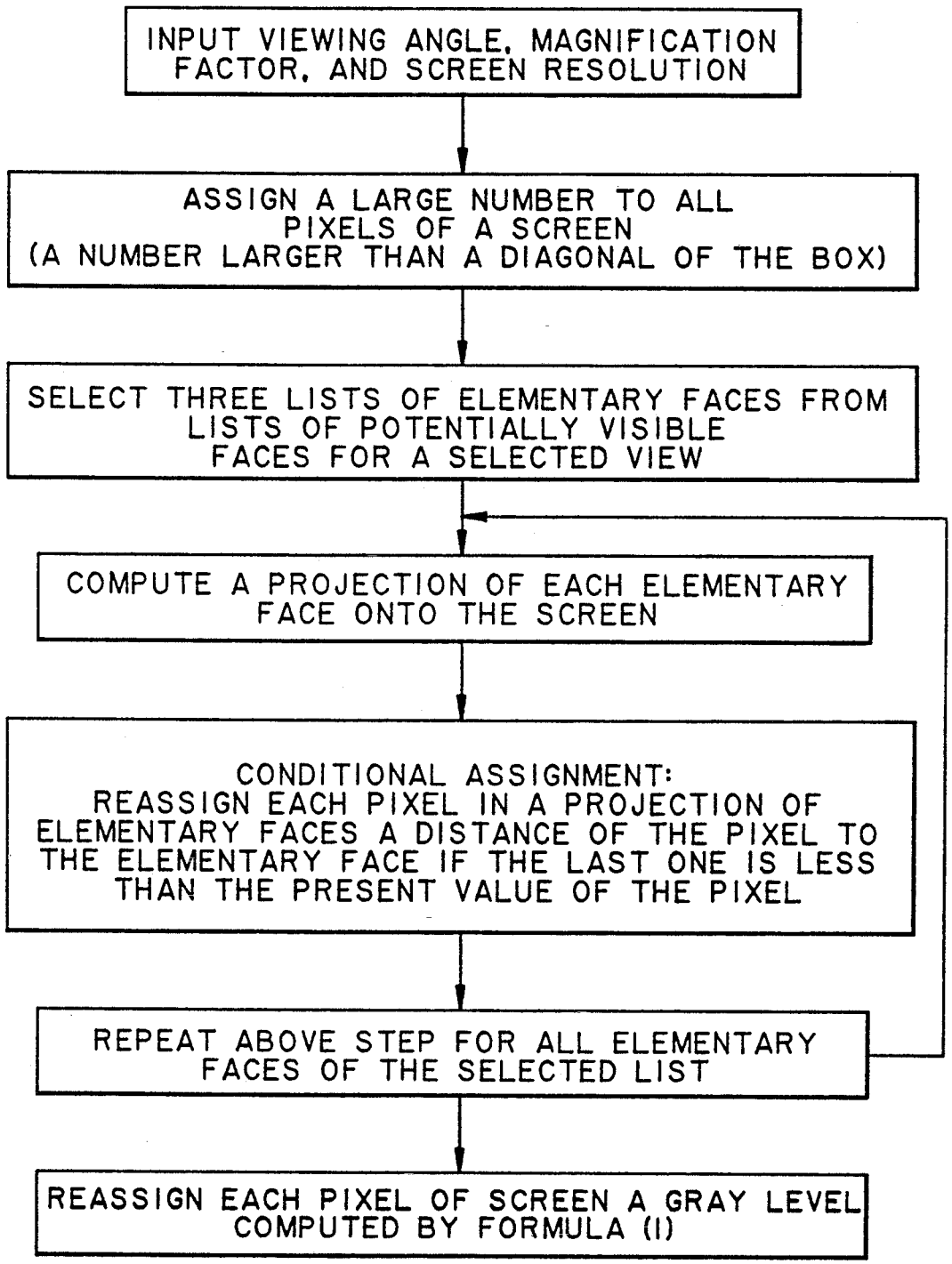
FIG. 6 is a flow chart of the viewing operations of the flow chart of FIG. 5.

Turning to FIGS. 5 and 6, a diagram of the three-dimensional image generation process implemented in the array processor 26 of FIG. 1 has been summarized in flow chart form.

With particular reference to FIG. 5, the system 94 for generating a visible three-dimensional object is disclosed. In step 96, a set of slice image data representative of a three-dimensional object is input. In step 98, a particular region of interest of one or more slices is isolated, and a particular object within that region of interest is selected in step 100. A segmentation process of isolating segments which belong to the object is undertaken in step 102.

In step 104, data representative of all potentially visible elementary faces associated to segments are isolated, and classified into six classes. From this data, viewing operations are undertaken in step 106. Finally, views are output to a display 34 (FIG. 1) in step 108.

Turning to FIG. 6, the method of viewing operations in step 106 will be disclosed. In step 106a, a viewing angle, magnification factor, and screen resolution, as selected by an operator, are input to the system. An arbitrary large number is assigned to each pixel on the screen in step 106b. In step 106c, three lists of elementary faces from lists of potentially visible faces for a selected view are input. From this, a projection of each elementary face onto the selected screen is computed in step 106d. In step 106e, a conditional reassignment is undertaken wherein each pixel in a projection of elementary faces is reassigned with a distance of the pixel to the elementary face if the last one is less than the present value of the pixel. In 106f, series of steps 106d and 106e are repeated for all elementary faces of the selected list. Finally, in step 106g, each pixel is reassigned a gray level computed by formula 1, above The foregoing teaches a system for generating a three-dimensional image of a subject specimen. Although it gives a good representation of the specimen's dimensions, often times surface density properties would be advantageous in an analysis of the specimen. It will be recalled that the originally obtained slice data is obtained by such means as a CT scanner or an MRI scanner. If, for example, data is obtained by a CT scanner, slice data is functionally related to an x-ray density of the specimen.

Figure 7:
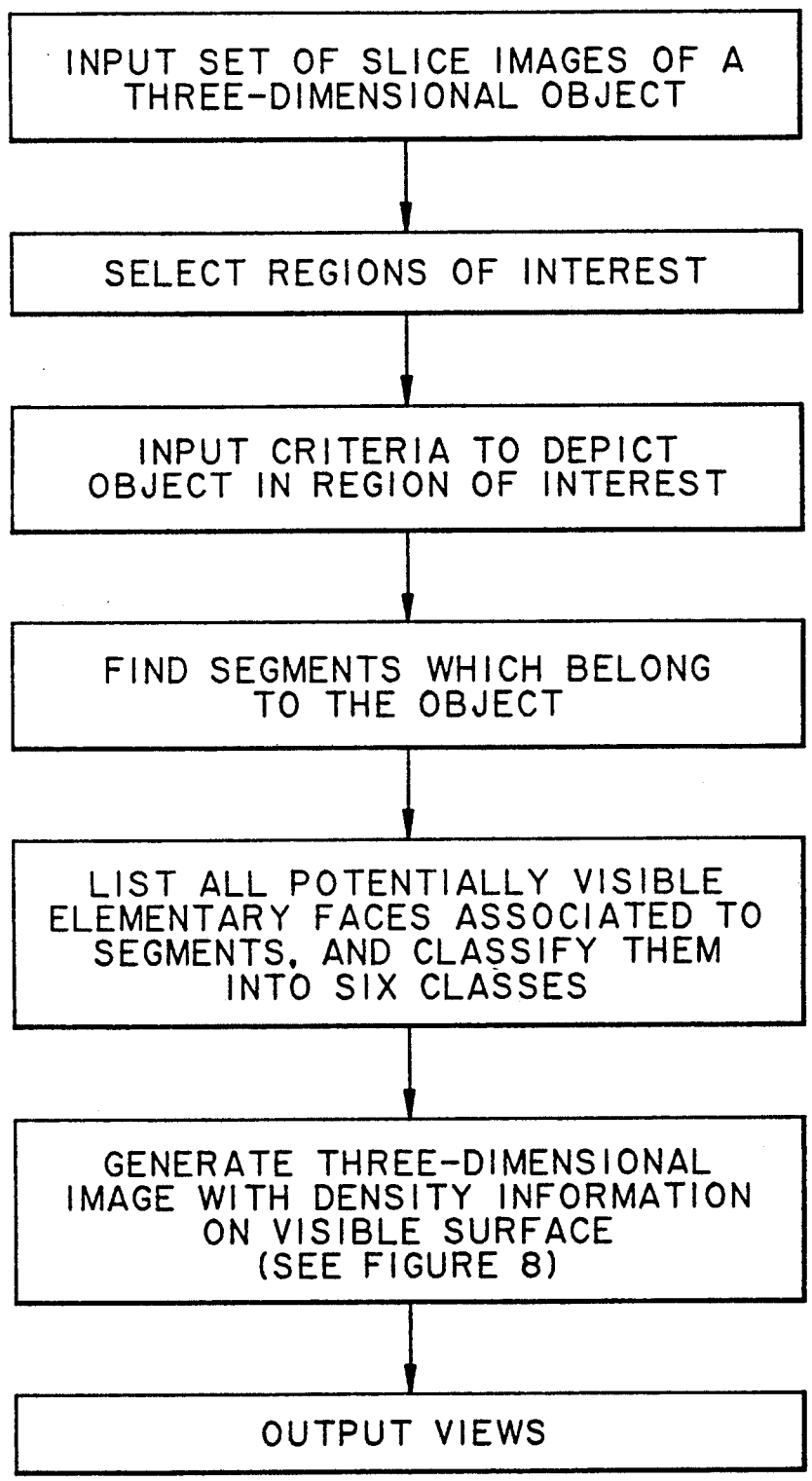
FIG. 7 is a flow chart illustrating an enhanced system for allowing surface density information to be displayed on a generated three-dimensional image.
Figure 8:
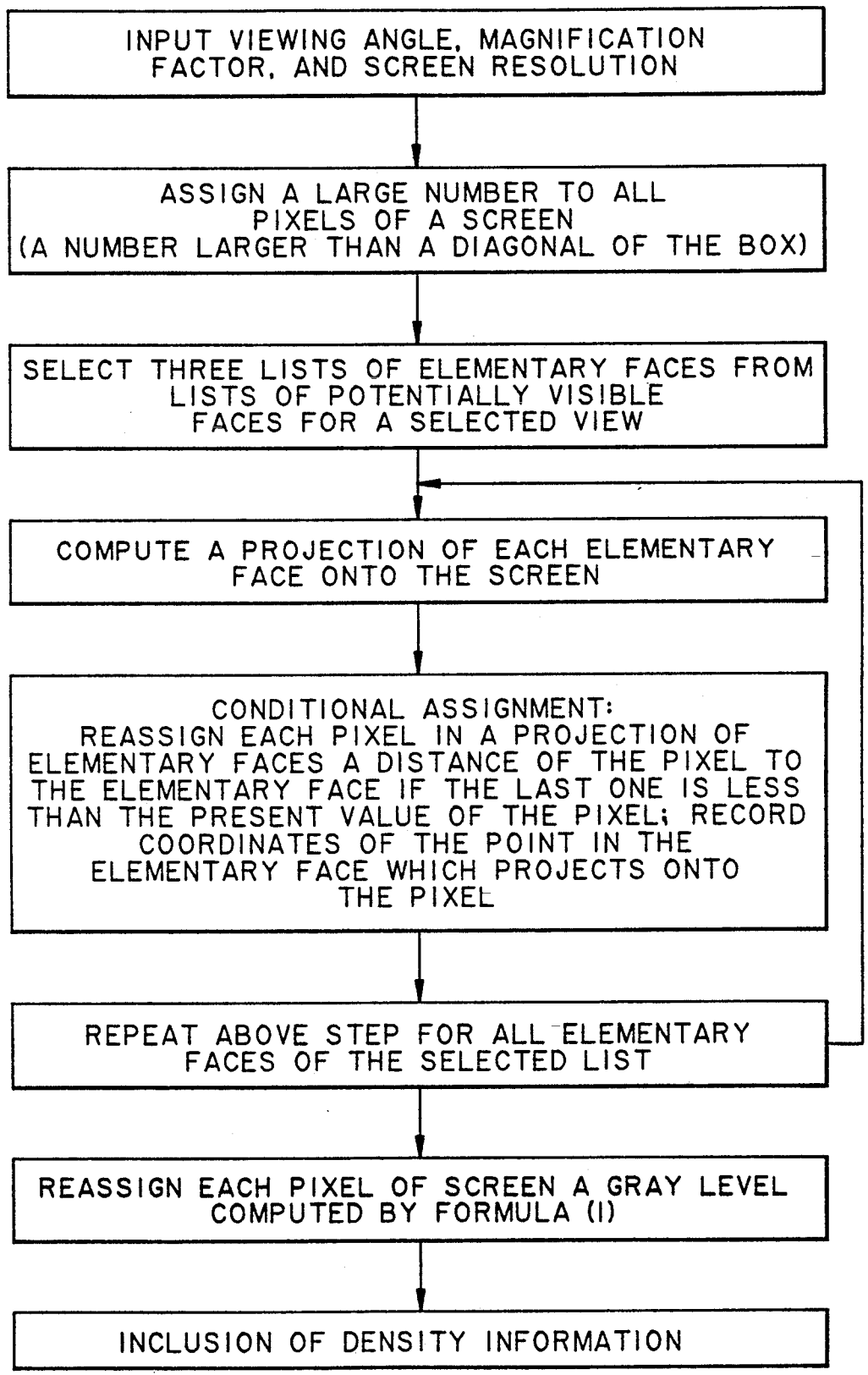
FIG. 8 is a flow chart of the surface density inclusion step of FIG. 7.

Turning to FIGS. 7 and 8, a system is summarized for implementing available data to obtain surface density representation on a three-dimensional image will be described in particularity below.

The following routine is adapted for generation of a three-dimensional image with surface density information encoded therein. It is, in the preferred embodiment, comprised of a software routine stored in memory 28.

The term "density" as used herein refers to, in the example of a CT scanner, the CT number or to $T_1$, $T_2$, IR, or the like (weighted or non-weighted), in the case of MRI.

To create a three-dimensional image with density information from a series of axial slices, a series of tasks which are performed to form a three-dimensional image (with surface information only). Moreover, coordinates of points on the surface of the object which are visible at the view in consideration are recorded during the execution of those tasks. Coordinates of potential visible points in the above-described conditional assignment is recorded using 3 two-dimensional arrays of size equal to the size of the screen. For example, if, relative to a viewing screen, (m,n) is a location of a pixel in the projection of an elementary face, the coordinates of the potentially visible point are recorded in the appropriate array at the location (m,n). If the pixel (m,n) is reassigned with a new distance, the previously recorded coordinates are substituted by the coordinates of the corresponding new potentially visible point.

After a shaded three-dimensional image pertaining to the surface of a three-dimensional object is created, a new set of tasks must be performed in order to:

(1) extract density information from the slice data obtained from the object at the visible points, using coordinates which were recorded earlier during the three-dimensional view formation;

(2) perform necessary density interpolation of the density of appropriate pixels or subregions of interest from two different regions of interest;

(3) combined this computed density value with the gray level representing the surface of the object at the visible point;

(4) store the above product at the orthogonal projection of the visible point onto the screen on which the three-dimensional image is formed.

The system for accomplishing the foregoing will be described in conjunction with FIGS. 7 and 8. In FIG. 7, steps 108, 110, 112, 114, and 116 mirror those steps noted in conjunction with FIG. 5. Their functions will not be repeated herein. With regard to step 118 (FIG. 8), the process proceeds analogously to FIG. 6 until steps 118e through 118h, during which steps the density information is incorporated.

The density information is incorporated as follows. In three two-dimensional arrays of coordinates of visible points, the coordinate representation is converted to a column number, a row number, and a region of interest ("ROI") number so that the density number can be retrieved from the original slice data of an appropriate ROI. An array containing the column number, row number, and ROI number of visible pixels is referred to as the X-array, the Y-array and the Z-array respectively. An interpolation across slices is needed to improve the poorer resolution normally encountered along the third or Z-dimension or axis. To economize computer storage, an interpolation code is stored in the Z-array. During such a conversion and storage, a total number, P of pixels within an ROI which are found in the X, Y, and Z-arrays is also stored for each ROI.

Next, a new two-dimensional array is created with a size equal to that of the screen area. This array, which is used to create a final three-dimensional picture with density information, is called the three-dimensional image density screen. The image density screen containing the three-dimensional image formed without the presence of density information, as described earlier, is called the three-dimensional image surface screen.

Next, the three-dimensional image density screen is initialized to zero.

Next, an ROI with a non-zero total number P is read, and the following operations are performed thereon:

(a) a scan through the Z-array is made to ascertain pixels containing ROI numbers matching ROI numbers in consideration. For example, (m,n) may be assumed to be the location of such a pixel.

(b) a column number and row number from the X, and Y-arrays is retrieved at the location (m,n). (x,y) is assumed to be the column and row number respectively.

(c) density information d is read from slice data of the ROI at the location (x,y). Using d as the address, a number D is read through a look-up table which was established, once for all, at an early stage right after the listing of all potentially visible elementary faces. The same look-up table may function as the identity look-up table. In this case, if the value D and d are the same; a non-modified density value is obtained.

In some instances, however, non-modified density values do not afford good image quality, especially when the dynamic range of d is large and the three-dimensional object has a complex surface boundary. In such a situation, surface structure is lost in some portions of the image due to low dynamic range capability (0 to 255) out of the display monitor device.

To circumvent this problem, a non-linear look-up table may be used. An example of such a look-up table is found in a case where it is subdivided into two parts. The lower part, which corresponds to soft tissue areas, serves as an identity look-up table. An upper part, which corresponds to bony areas, is a look-up table of slope, near zero, starting from the tail of the lower part look-up table.

(d) The number D is multiplied with a weight, w, between 0 and 1. This weight number is found through a look-up table using codes embedded in the Z-array at the location (m,n).

(e) The product w*D is added to the three-dimensional image density array at the location (m,n).

(f) The pixel number P is decremented by 1.

(g) Steps (a) through (g) are repeated until the number P becomes zero.

Next, the operations of step four are repeated for all ROI's with a non-zero P.

Finally, for all pixels which correspond to a visible point on the three-dimensional object, the three-dimensional density content is multiplied with their three-dimensional surface content, and the product is divided by the maximum value of the three-dimensional image surface array. Contents of remaining pixels are set to a negative number, such as minus 1000. This division is necessarily only when a surface array is not normalized, i.e. the shaded value is not in floating point format (a number between 0 and 1).

Returning to FIG. 7, the new image incorporating the density information is output in step 120.

With the foregoing, a system is provided for generating a three-dimensional image from a series of slice scans on a conventional processor means. Surface density information may be added to the generated three-dimensional object.

Figure 9:
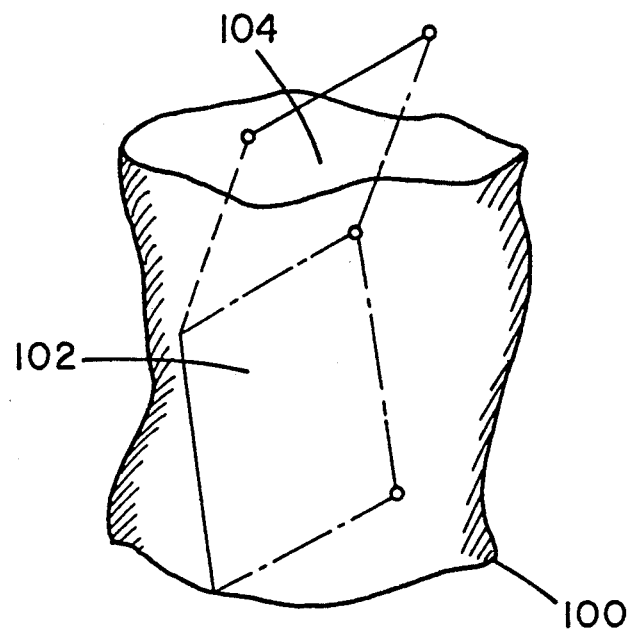
FIG. 9 illustrates a specimen image for cutting and viewing in accordance with the present invention.

Oftentimes, it is also desirable to selectively view a selected portion of a three-dimensional object which has been created. For example, if a spinal image column is illustrated, a physician may "split" the spine along one or more planes to facilitate viewing of an interior surface thereof. For example, turning to FIG. 9, a three-dimensional image of an object or specimen 120 represents a three-dimensional image. It may be desirous to cut the image 120 into one or more sections. Two sections are illustrated as cut along a surface such as that formed by planes 122, 124.

In the subject system, three means are defined to specify a cut surface for segmentation of a three-dimensional image. In a first, two curves have a common vertex or intersection point. The first curve is referred to as a primary curve and the second curve as a directional curve. In a second, one curve serves to cut the surface. In a third, two non-intersecting curves (without a common vertex) are used to define a cut surface. In each situation, the three-dimensional image is cut into at least first and second portions. A selected point on a surface of one portion suitably designates it for display after segmentation.

A curve for the foregoing is defined by a finite number of control points. Each point identified on the screen provides a point on the three-dimensional surface of the three-dimensional object image. A curve is obtained by connecting, by a line segment, two points of the three-dimensional surface associated with two consecutive control points.

The first case, noted above, is the most difficult to visualize, and will be described in conjunction with FIGS. 10a-f. In this case, a primary curve 130 and a secondary or directional curve 132 share a common vertex v. The cut surface is obtained as illustrated in the FIG. 10.

Figure 10B:
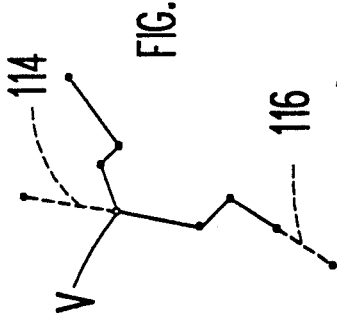
FIG. 10a-f illustrate a procedure for cutting an image in the system of the present invention.
Figure 10D:
Figure 10F:
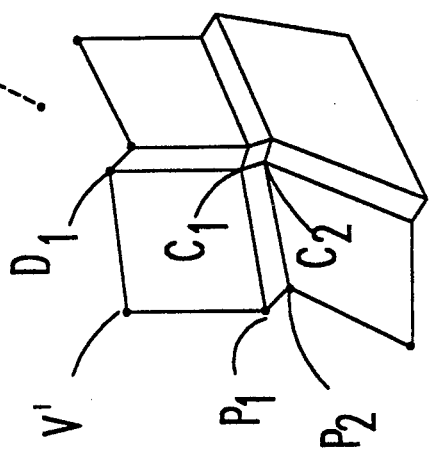
Figure 10A:
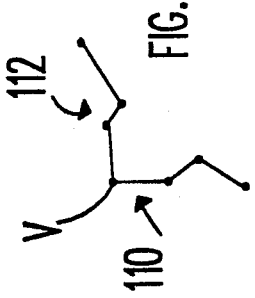

In FIG. 10a, the primary curve 130 and the directional curve 132, meet at the common vertex point v.

In FIG. 10b, both ends of the primary curve 130 are extended at 134, 136, until they exceed the three-dimensional BOI. The vector 134, joining the common vertex v and an endpoint 134a of a backward extension of the primary curve, is called its backward extension vector.

Figure 10C:
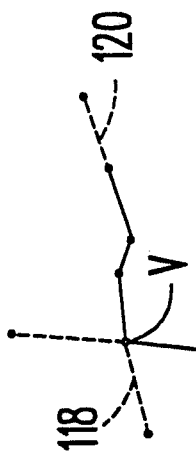

In FIG. 10c, both ends of the directional curve 132 are extended at 138, 140, until they exceed the three-dimensional BOI. The vector 138, joining the common vertex and the endpoint 138a of the backward extension of the directional curve, is similarly referred to as a backward extension vector of the directional curve. Extensions 134 and 138 are extensions defined to exceed the BOI.

In FIG. 10d, the primary curve 130 is translated with a vector of translation equal to backward extension vector 138 (FIG. 10c) of the directional curve. Thus, the modified primary 130' is formed.

Figure 10E:
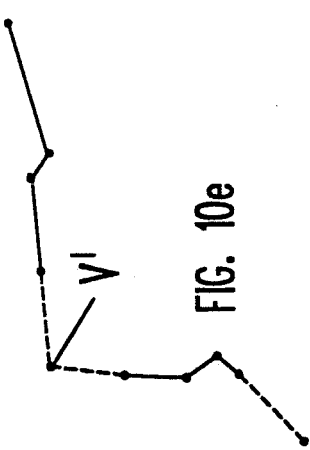

In FIG. 10e, the directional curve is similarly translated with a vector of translation equal to the backward extension vector 134 of the primary curve 130. Thus, the modified directional curve 132' is found. It will be noted that after completion of the foregoing two steps, the translated curves are caused to again have one common end point called the new common vertex v'.

In FIG. 10f, a cut surface is generated by a method of parallelogram completion, starting from the new common vertex v' of the extended primary and directional curves. Starting from three non-colinear points such as the common vertex v', a point $P_1$, (on the translated primary curve) and a point $D_1$, (on the translated directional curve) create another point $C_1$, which is the fourth vertex of a parallelogram $P_1$, v', $D_1$, $C_1$. The next parallelogram completion, starting from the three points $P_2$, $P_1$, $C_1$, create a point $C_2$. And subsequent parallelograms are completed in a like manner. The parallelogram completion is done along the primary curve until the last parallelogram is out of the three-dimensional box.

In the situation wherein only one curve is used to bisect the three-dimensional object, the same general steps are followed except that the directional curve is assumed to be in a line perpendicular to the screen.

The actual implementation of a cutting operation is summarized in FIG. 11. In step 140, three-dimensional image data are selected. In step 142, a cutting surface, such as that defined in FIG. 10, is defined. In step 144, one of the portions of the three-dimensional surface is selected by selection of a point on that surface. In step 146, patching to define a cutting surface is performed. In step 148, one of two segments is selected by patching. One portion of the three-dimensional image is eliminated in step 150. Finally, an image of the selected portion of the three-dimensional surface is generated in step 152.

Figure 12:
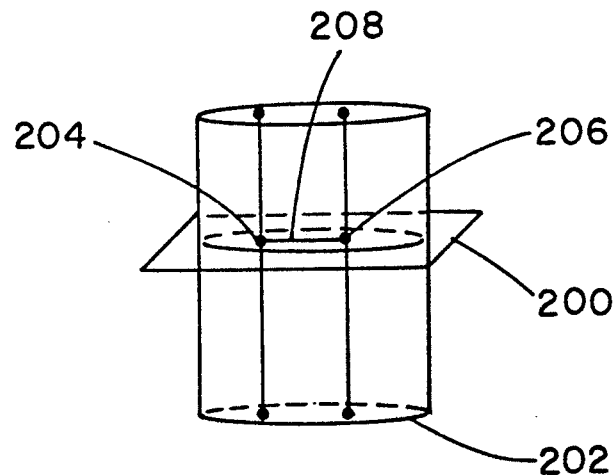
FIG. 12 illustrates an alternate cutting operation of the present invention.

Turning to FIG. 12, case three above is illustrated. In this situation, two, non-intersecting curves are defined without a common vertex. The cut surface is generated from a sequence of slices as follows.

First find the 3-dimensional curves 210 and 212 which correspond to the two dimensional curve drawn on the screen.

Second, there are at most two points of intersection between any region of interest with the two curves 210, 212.

Thirdly, on a region of interest with two points of intersection, points are connected with a line 214. This line is considered to be a line of intersection of a cut surface with a region of interest.

Fourthly, on a region of interest with one point of intersection, the line of intersection of the cut surface is assumed to be the line passing through the intersection point and parallel to the line of intersection (not shown) of the cut surface with the previous slice. If there is no previous slice, a direction is assumed to be normal to the screen.

Fifthly, on a region of interest with no point of intersection, the line of intersection of the cut surface with a region of interest is assumed to be the orthogonal projection onto the region of interest of a line of intersection of the cut surface with a previous region of interest in a sequence thereof. If this region of interest an initial first region of interest, the line of intersection is assumed to be outside the of the region of interest.

Lastly, the lines of intersection of the cut surface with all the regions of interest of the three-dimensional box are used to do the cutting of the actual three-dimensional object. Cutting can be performed from the lines of intersection because the object is defined only with the slices.

The three cases allow for cutting of a three-dimensional object image easily and efficiently along any plane or planes of interest. This provides an aid to physicians and technicians in an examination procedure.

The flow of the aforenoted cutting may be summarized as follows:
1. Select a three-dimensional image;
2. Draw 1 or 2 curves on the three-dimensional image to define a cut surface;
3. Select the portion to do three-dimensional image by selecting a point on the three-dimensional image;
4. Define the cut surface based on the curves previously drawn on the screen;
5. The patch surface divides the box of interest (or three-dimensional box) two parts. Identify the part containing the point selected in step 3;
6. Perform the actual cutting of the three-dimensional object and collect the part containing the point selected in step 3; and
7. Do the three-dimensional image reformatting of the collected part.

Figure 13:
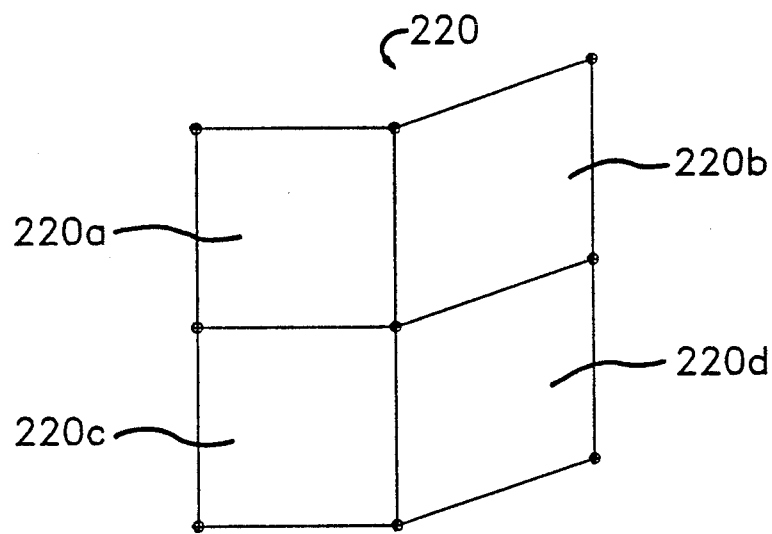
FIG. 13 illustrates an exemplary cut surface, analogous to that illustrated by FIG. 10.
Figure 15:
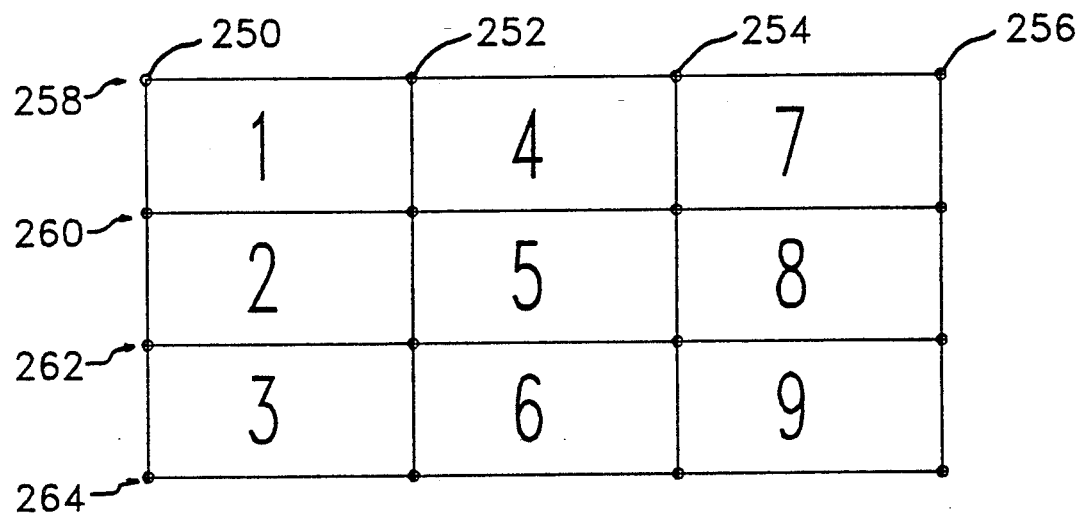
FIG. 15 illustrates a sequential scan of data to apportion three-dimensional image data in accordance with a cut surface.

Turning now to FIGS. 13 through 15, a modified cutting process apportions segments a three-dimensional object for viewing purposes from slice data. It will be recalled that the three-dimensional image is stored as spatially encoded image data, which is typically represented by discrete image data points. These image data points are representative of a physical characteristic of the subject object.

FIG. 13 illustrates a cutting surface 220, such as that formed by the cutting procedure described in conjunction with FIG. 10. The cutting surface is stored in memory as spatially encoded cutting surface data. As illustrated, the cutting surface 220 may be visualized as being comprised of parallelograms 220a, 220b, 220c, and 220d.

Figure 14A:
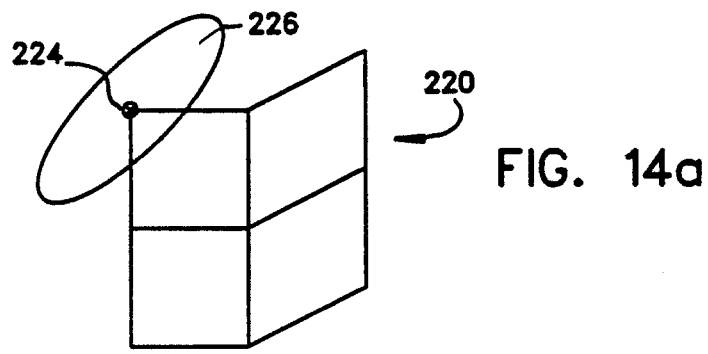
FIG. 14a-c illustrate a series of possible intersections between slices and cutting surface.
Figure 14B:
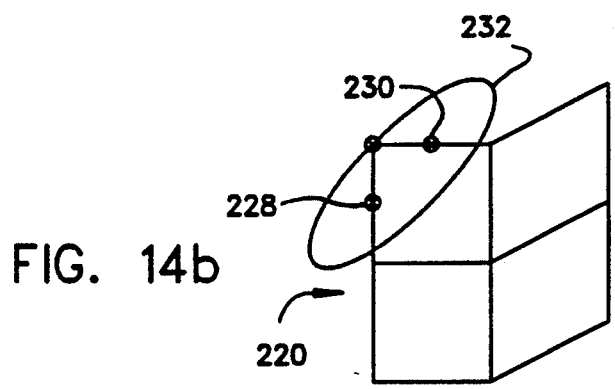
Figure 14C:
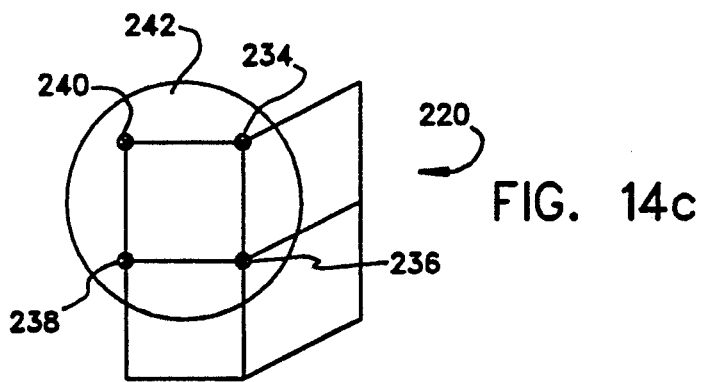

Turning to FIG. 14a-14c several possible situations in which a cut surfaces, such as that surface 220 illustrated by FIG. 13, are superimposed on the series of slices 224 are illustrated. Three possibilities of intersection therebetween are present. The possibilities are contingent upon relative orientations of a cutting surface to image slice.

In a first situation, illustrated in FIG. 14a, one unique point 224 of the cut surface is found to lie on a particular slice 226. In a second situation, illustrated in FIG. 14b, two unique points 228, 230 of the cut surface lie on a particular slice 232. In a third situation, illustrated in FIG. 14c, all four corners 234, 236, 238, 240 of a parallelogram lie on a particular slice 242.

In the modified system for generation of a sliced three-dimensional image, the values of situation one (FIG. 14a), the values are disregarded. In situation two (FIG. 14b), the two points of intersection are stored as a line. In situation three (FIG. 14c), the intersection is stored as a series of four lines. Implementation of this step on a series of slices yields a list of connected line segments for each slice which represents where the surface which cuts the slice.

Next, cutting lines of the surface 220 are mapped to each scan line or region of interest row for each slice of the slice list. In this step, for each line segment in a slice list, a calculation of an intersection of the line segment and all scan lines is made. This yields a list of points for each scan line in each slice wherein the cutting surface intersects each respective scan line.

Turning to FIG. 15, illustrated is a sequence of collection of data points from the selected object. Initially, the procedure is commenced at a start or commencement point such as point 250, which is illustrated in the upper left hand corner of FIG. 15. A line segment is defined as extending from the commencement point to an arbitrary object reference point which is located on one side of the cutting surface. This control point dictates whether the portion of the three-dimensional object is to be kept or discarded. A portion of the object, as defined by the cutting surface, is kept if it is on the same side as the control point, and discarded otherwise.

To facilitate such a selection, a numeric value is assigned to each point. A factor, such as an even value, is assigned if the point lies on the same side as the control point. An odd numbered value is assigned otherwise. This is done by calculating a number of intersections between the segment and the parallelograms of the cutting surface.

A scan of all points on the region of interest is completed as follows. From the starting point 250, the points 252, 254, and 256 of a first row 258 are sequentially tested. A "discard" mode is initially entered during the scanning sequence. Points are discarded until a point of intersection or the end of a line of reach. In the event an intersection is reached, the process is switched from the "discard" mode to a "keep" mode. In this mode the points will be kept until another intersection is reached. When an end of a line is reached, the mode, that is keeping or discarding, is reset to the way it was at the beginning of the previous line. The process is continued for subsequent rows such as 260, 262, and 264.

In this fashion, it must be monitored when the cutting surface intersects the left edge (y-axis) of the region of interest at the next row. In this event, the mode at the beginning of the next line is opposite to the mode (keep or discard, implemented at the beginning of the previous line. This process is continued until all points are exhausted at the completion of the last row illustrated at 264. This process is then continued for all slices.

During the slice scan, it must be determined whether the cutting surface intersects the corner (z-axis) of the regions of interest at the beginning of the next slice. In this situation, the mode at the beginning of the next slice is set opposite to the mode at the beginning of the previous slice. With this scheme, an appropriate portion of the original object has been kept (collected) and the remainder has been discarded. Accordingly, data sufficient to facilitate viewing of a portion of the selected three-dimensional image is isolated, and serves to generate this image on a viewing screen.

The invention has been described with reference to the preferred embodiment. Obviously modifications and alterations will occur to others upon the reading and understanding of this specification. It is intended that all such modifications and alterations be included insofar as they come within the scope of the appended claims or the equivalents thereof.

Having thus described the invention, it is now claimed:

1. A system for generating diagnostic images comprising:

image memory means for storing spatially encoded image data representative of a physical characteristic of a three-dimensional object;

means for generating spatially encoded primary curve data representative of a selected primary curve;

surface generation means for generating spatially encoded cutting surface data in accordance with the selected primary curve;

means for apportioning the spatially encoded image data into at least first and second portions in accordance with the cutting surface data;

means for generating a visual display in accordance with spatially encoded data of at least one of the portions;

means for generating spatially encoded secondary curve data representative of a second selected curve and wherein the surface generation means further includes means for generating the cutting surface data in accordance with the secondary curve data;

wherein each selected curve is defined as a continuous line comprised of at least one line segment, and wherein each curve has first and second end points at extremes thereof;

wherein the first and second curves have a common vertex point defined by a common end point; and wherein the surface generation means includes, means for acquiring spatially encoded region data representative of an extent of the three-dimensional object from the spatially encoded image data, means for selectively extending the primary curve from at least one end thereof, such that the primary curve is at least coextensive with the extent of the spatially encoded image data, means for selectively extending the secondary curve from at least one end thereof, such that the secondary curve is at least coextensive with the extent of the spatially encoded data, means for selectively reorienting the primary and secondary curves such that the vertex point is maintained at endpoints of any curve extensions progressing therebeyond, and means for generating the cutting surface data by parallelogram completion between respective segments of the primary curve and the secondary curve.

2. A system for generating diagnostic images comprising:

image memory means for storing spatially encoded image data representative of a physical characteristic of a three-dimensional object;

means for generating spatially encoded primary curve data representative of a selected primary curve;

surface generation means for generating spatially encoded cutting surface data in accordance with the selected primary curve;

means for apportioning the spatially encoded image data into at least first and second portions in accordance with the cutting surface data;

means for generating a visual display in accordance with spatially encoded data of at least one of the portions;

means for generating spatially encoded secondary curve data representative of a second selected curve and wherein the surface generation means further includes means for generating the cutting surface data in accordance with the secondary curve data;

wherein each selected curve is defined as a continuous line comprised of at least one line segment, and wherein each curve has first and second end points at extremes thereof;

means for categorizing the spatially encoded image data into at least one cross-sectional generally planar region; and wherein the surface generation means further includes;

means for determining a first intersection point, if any, between the primary curve and each generally planar region, means for determining a second intersection point, if any, between the secondary curve and each generally planar region, means for generating spatially encoded line data for each generally planar region having both first and second intersection points thereon, the line spatially encoded line data being representative of a line segment extending between the first and second intersection points, means for generating spatially encoded line data for each generally planar region having one of the first and second intersection points thereon, the spatially encoded line data being representative of a line segment passing through the one of the first and second intersection points, with a direction thereof being defined by one of (a) parallel with a direction of a line segment to a neighboring generally planar region, and (b) normal to a viewing direction, means for generating spatially encoded line data for each generally planar region having no intersection points thereon, the line being defined by one of (a) an orthogonal projection of a line segment of a neighboring generally planar region onto the generally planar region with no intersection points thereon, and (b) outside of a range of the three-dimensional object represented by the spatially encoded image data, and means for generating the cutting surface data in accordance with a cutting surface plane passing through each line segment.

3. A system for generating three-dimensional images comprising:

image memory means for storing of spatially encoded image data, representative of a physical characteristic of a three-dimensional object, as a series of generally planar slices with each slice being comprised of a series of generally parallel scan lines, whereby each scan line is comprised of a portion of the image data points;

cutting surface data storage means for storing cutting surface data representative of a cutting surface for apportioning the spatially encoded image data into at least first and second portions;

apportioning means for apportioning the spatially encoded image data points into at least first and second portions in accordance with the cutting surface data, the apportioning means including, slice data comparison means for comparing image data points of a slice with the cutting surface data, means for determining slice intersection points between the cutting surface and image data points of each of the slices in accordance with an output of the slice data comparison means, means for generating data representative of a line segment interconnecting each plurality intersection points lying in a common one of the planar slices, mapping means for determining scan line intersection points between generally each scan line of a planar slice and each line segment of each slice, dividing means for dividing the spatially encoded image data points into at least the first and second portions in accordance with the scan line intersection points; and means for generating a visual display in accordance with spatially encoded data of at least one of the portions.

4. The system of claim 3 wherein the dividing means includes:

scanning means for sequentially scanning the image data points in each scan line;

scan line comparison means for sequentially comparing each image data point of each scan line to data representative of a preselected control point;

selecting means for selectively keeping and ignoring image data points in accordance with an output of the scan line comparison means, whereby one of the portions is selected for visual display.

5. The system of claim 4 wherein the selecting means includes:

means for assigning one of a presumed keep and ignore state to each image data point; and means for complementing a presumed state of a next image data point in a sequential scan of the scan line comparison means when the next image point is a scan line intersection point.

6. The system of claim 5 further comprising means for sequentially scanning the series of slices and sequentially implementing the apportioning means thereon.

7. The system of claim 6 further comprising means for assigning a presumed state to an initial image data point of a slice in accordance with a state of a image data point of a preceding slice.

8. A method for generating a display comprising the steps of:

storing spatially encoded image data representative of a physical characteristic of a three-dimensional object;

generating spatially encoded cutting surface data in accordance with the selected primary curve;

generating spatially encoded secondary curve data representative of a second selected curve;

acquiring spatially encoded region data representative of an extent of the three-dimensional object from the spatially encoded data;

selectively extending the primary curve at at least one end thereof, such that the primary curve is at least coextensive with the extent of the spatially encoded data;

selectively extending the secondary curve at at least one end thereof, such that the secondary curve is at least coextensive with the extent of the spatially encoded data;

selectively reorienting the curves such that a vertex point is maintained at endpoints of any curve extensions progressing therebeyond; and generating a cutting surface data by parallelogram completion between respective segments of the primary curve and the secondary curve;

apportioning the spatially encoded image data into at least first and second portions in accordance with the cutting surface data;

generating a visual display in accordance with spatially encoded data of at least one of the portions.

9. The method of claim 8 further comprising the steps of:

categorizing the spatially encoded image data into at least one cross-sectional generally planar region;

determining a first intersection point, if any, between the primary curve and each generally planar region;

determining a second intersection point, if any, between the secondary curve and each generally planar region;

generating spatially encoded line data for each generally planar region having both first and second intersection points thereon, the line data being representative of a line segment extending between the first and second intersection points;

generating spatially encoded line data for each generally planar region having one of the first and second intersection points thereon, the line data being representative of a line segment passing through the one of the first and second intersection points, with a direction thereof being defined by one of (a) parallel with a direction of a line segment to a neighboring generally planar region, and (b) normal to a viewing direction;

generating spatially encoded line data for each generally planar region having no intersection points thereon, the line being defined by one of (a) an orthogonal projection of a line segment of a neighboring generally planar region onto the generally planar region with no intersection points thereon, and (b) outside of a range of the three-dimensional object represented by the spatially encoded image data; and generating the cutting surface data in accordance with a cutting surface plane passing through each line segment.

10. The method of claim 9 further comprising the step of defining the cutting surface in accordance with the primary curve and a viewing direction.

11. A method or generating three-dimensional images comprising the steps of:

storing a plurality of spatially encoded image data points, representative of a physical characteristic of a three-dimensional object as a series of generally planar slices with each slice being comprised of a series of generally parallel scan lines, whereby each scan line includes a portion of the image data points;

storing spatially encoded cutting surface data representative of a cutting surface for apportioning the spatially encoded image data points into at least first and second portions;

apportioning the spatially encoded image data points into at least first and second portions in accordance with the cutting surface data, the apportioning step including.

comparing image data points of each slice with the cutting surface data, determining slice intersection points between the cutting surface and image data points of each of the slices, generating line segment representative of a line segment interconnecting each plurality intersection points lying in each planar slice, mapping scan line intersection points between generally each scan line of a planar slice and each line segment of each slice, dividing the spatially encoded image data points into at least the first and second portions in accordance with the scan line intersection points; and generating a visual display in accordance with spatially encoded data of at least one of the portions.

12. The system of claim 11 further comprising the steps of:

sequentially comparing each image data point of each scan line to data representative of a preselected control point;

selectively keeping and ignoring image data points in accordance with an output of the scan line comparison means.

13. The method of claim 12 further comprising the steps of:

assigning one of a presumed keep and ignore state to each image data point; and complementing a presumed state of a next image data point in a sequential scan of the scan line comparison means when the next image point is a scan line intersection point.

14. The method of claim 13 further comprising the step of sequentially scanning the series of slices and sequentially implementing the apportioning means thereon.

15. The system of claim 14 further comprising the step of assigning a presumed state to an initial image data point of a slice in accordance with a state of a image data point of a preceding slice.

16. A system for representation generating a three-dimensional diagnostic comprising:

image memory means for storing spatially encoded image data representative of a physical characteristic of a three-dimensional object;

means for interactively generating spatially encoded primary curve data representative of a selected primary curve;

surface generation means for generating three-dimensional spatially encoded cutting surface data in accordance with the selected primary curve;

means for apportioning the spatially encoded image data into at least first and second portions in accordance with the cutting surface data; and means for generating a three-dimensional representation in accordance with spatially encoded data of at least one of the portions.

17. A method for generating a three-dimensional representation comprising the steps of:

storing spatially encoded image data representative of a physical characteristic of a three-dimensional object;

interactively generating spatially encoded primary curve data representative of a selected primary curve;

generating three-dimensional spatially encoded cutting surface data in accordance with the selected primary curve;

apportioning the spatially encoded image data into at least first and second portions in accordance with the cutting surface data; and generating a three-dimensional representation in accordance with spatially encoded data of at least one of the portions.

* * * * *